(No Model.) 2 Sheets—Sheet 1.
G. G. HUNT.
HARVESTER.
No. 428,275. Patented May 20, 1890.
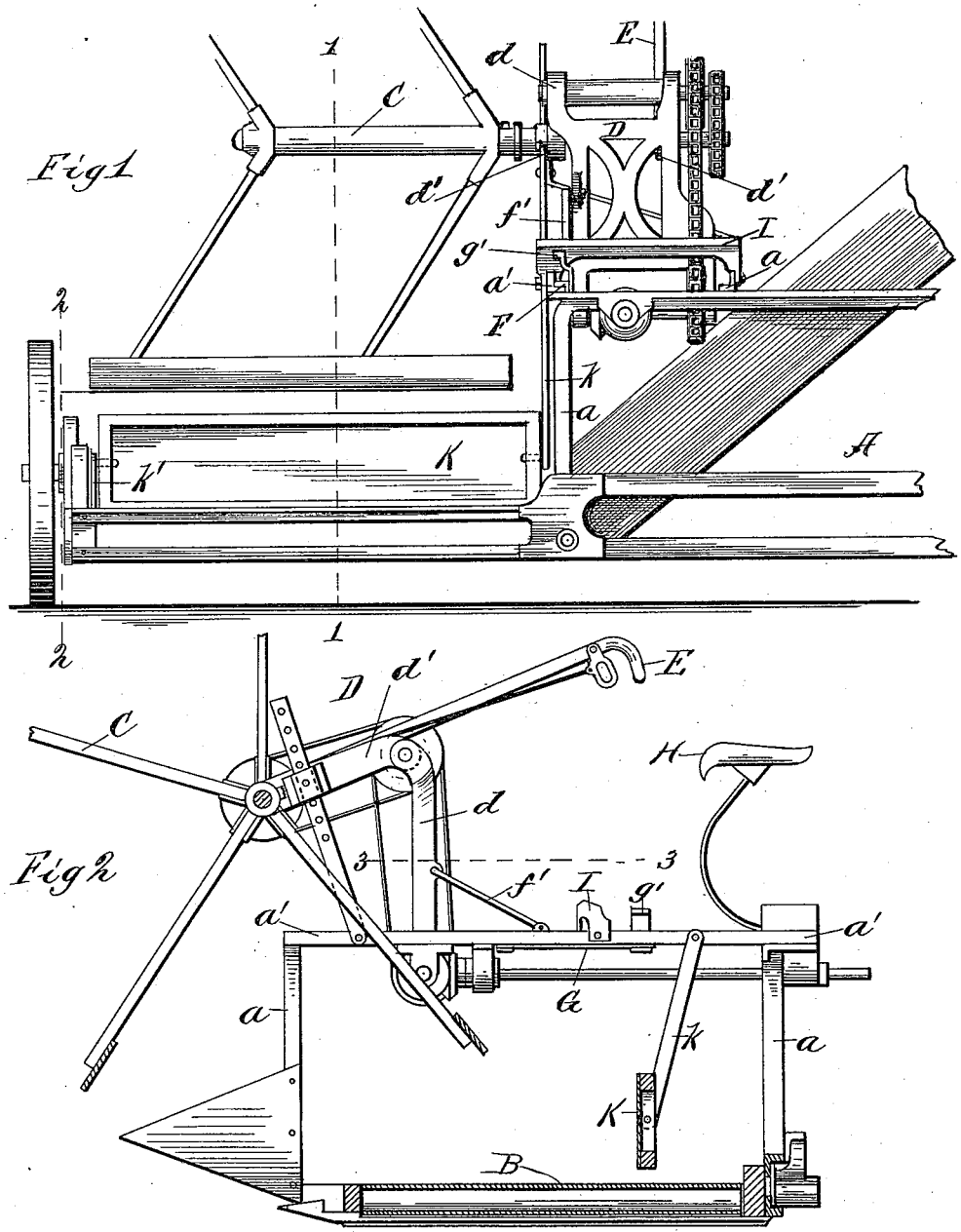
Witnesses
W. C. Corlies
A. M. Best
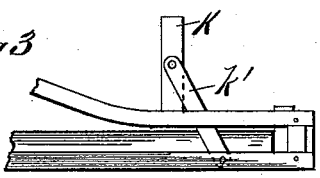
Inventor
George G. Hunt
By Coburn & Thacher
Attys (No Model.) 2 Sheets—Sheet 2.
G. G. HUNT.
HARVESTER.
No. 428,275. Patented May 20, 1890.
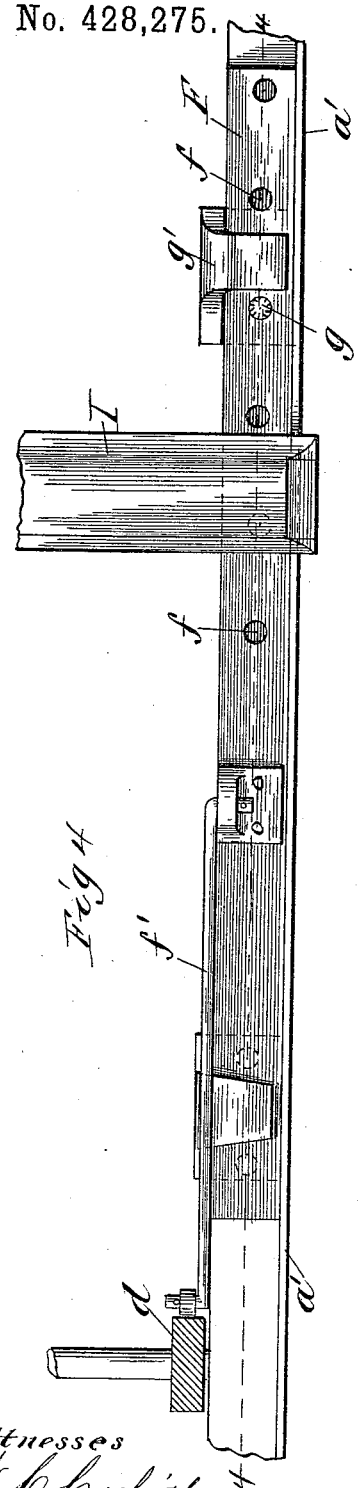
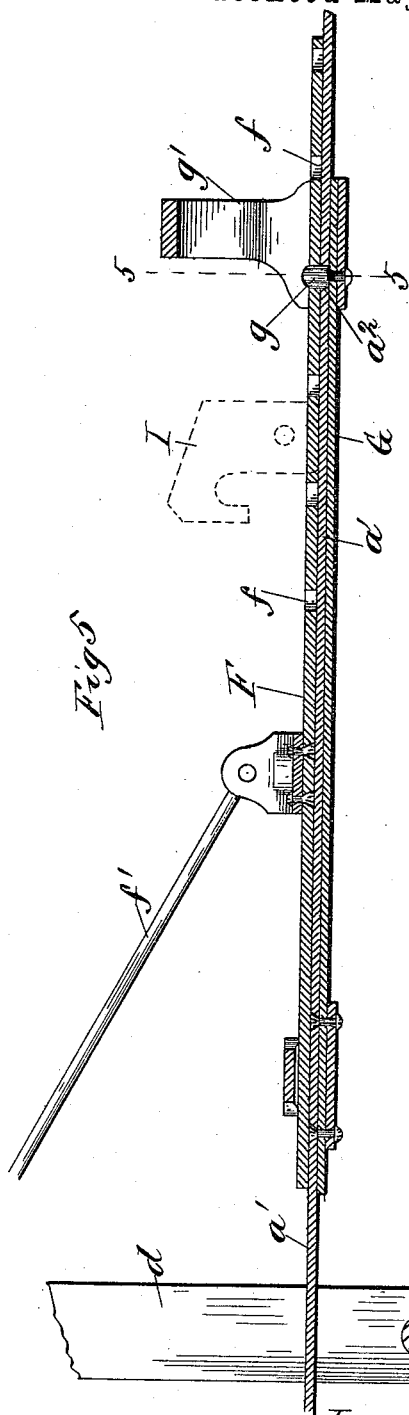
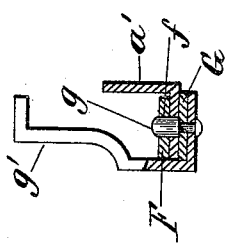
Witnesses
W. C. Coolies
A. M. Best
Inventor
George G. Hunt
By Coburn & Thacher
Attys

UNITED STATES PATENT OFFICE.

GEORGE G. HUNT, OF BRISTOL, ASSIGNOR TO THE PLANO MANUFACTURING COMPANY, OF CHICAGO, ILLINOIS.

HARVESTER.

SPECIFICATION forming part of Letters Patent No. 428,275, dated May 20, 1890.

Application filed May 29, 1889. Serial No. 312,557. (No model.)

*To all whom it may concern:*

Be it known that I, GEORGE G. HUNT, a citizen of the United States, residing at Bristol, in the county of Kendall and State of Illinois, have invented certain new and useful Improvements in Harvesters, which are fully set forth in the following specification, reference being had to the accompanying drawings, in which—

Figure 1 represents a rear elevation of so much of a harvester as is necessary to illustrate my present improvements; Fig. 2, a cross-section of the same, taken on the line 1 1 of Fig. 1; Fig. 3, a detail section taken on the line 2 2 of Fig. 1; Fig. 4, a detail plan of the reel-adjusting devices on an enlarged scale; Fig. 5, a section of the same, taken on the line 4 4 of Fig. 4; and Fig. 6, a cross-section of the same, taken on the line 5 5 of Fig. 5.

My invention relates to certain improvements in grain-harvesters, these improvements referring especially to the devices for adjusting the reel and locking it in any desired position and an adjustable grain-guard arranged at the rear of the platform.

As my present improvements relate only to the parts of the machine just mentioned above, it is not necessary to show and describe an entire harvester. I have therefore shown in the drawings only so much of the machine as is required to fully illustrate an embodiment of the invention.

I will describe in detail the construction and operation of the mechanism shown in the drawings, whereby I have embodied in one way and in practical form my present invention, and will then point out definitely in the claims the special improvements which I believe to be new and desire to secure by Letters Patent.

In the drawings, A represents a portion of the gearing-frame and upright frame of the machine, and B the platform. As shown in the drawings, the upright frame consists of front and rear uprights $a$ and cross sills or bars $a'$, mounted on the top thereof, though this particular construction is not material. The reel C has its shaft mounted upon a double-hinged reel-support D, consisting of the two arms or frames $d\ d'$, the first of which is hinged at one end to the upright frame of the machine and the second of which is hinged to the outer or free end of the first and carries upon its outer or free end the reel-shaft. This reel-support is well known and designed to provide for the double adjustment of the reel—that is, both vertically and horizontally. The usual lever E is fastened to the outer support, which is moved up and down in a well-known way by this lever, and is secured in any desired adjustment by any known and suitable locking device. These features do not constitute any part of my present improvement. The horizontal adjustment of the reel is effected, as usual, by the vibration of the arm or frame $d$ upon the hinge-joint whereby it is attached to the upright frame. The special devices for adjusting and securing this last-mentioned member of the support will now be described.

A slide F is mounted upon a cross-bar on the top of the upright frame and extending from front to rear thereof. In this instance the inner cross-bar $a'$ of the frame is used. This bar $a'$ is of angle-iron, as seen in Fig. 1 of the drawings, and the slide F is a long flat strip adapted to rest upon the flat portion of the bar, as seen in Fig. 4 of the drawings. The slide is provided with a series of holes $f$, and is connected by a rod $f'$ with the swinging support $d$. A long spring G is arranged underneath the bar $a'$, being fastened thereto at its forward end, but free at its rear end, where it is provided with a short stud $g$, which passes up through an aperture $a^2$ in the bar, and is adapted to engage with any one of the holes $f$ in the slide above. A foot-piece $g'$ is also attached to the rear end of the spring and carried up around and above the bar, this rest being arranged near the driver's seat H. Now it is evident that when the stud on the spring is engaged with the slide, which is the normal relation of the parts, the said slide is held against movement in either direction, and so the upright member $d$ of the reel-support will be secured in the position to which it is adjusted. Whenever it is desired to change the adjustment, the driver depresses the spring G by placing his foot on the piece $g'$. It is evident that this will release the slide, and by means of the lever E the upright member $d$ of the reel-support may be swung forward or backward, the slide freely reciprocating to accommodate this movement, and when brought to the position required, the spring being released, will again engage with the latter and secure the parts in the new position to which they may be adjusted. A foot-rest I is fastened to the cross-bars and extends over the slide. This is an ordinary rest for the driver's feet, and also serves as a stop to the rearward movement of the slide, so as to prevent the reel-support from falling back too far when the parts are entirely released, as will be seen from the relation of the parts illustrated in Fig. 2 of the drawings. As explained above, the bar which supports the slide is in this case one of the regular cross-bars of the upright frame; but obviously this is not a necessity. A separate and special cross-bar may be provided for this purpose, if desired.

A grain-guard K is arranged at the rear portion of the grain-platform, and is mounted so as to be readily adjustable backward and forward and also as to the angle in which it stands to the platform. In order to effect this result, this guard, which is rectangular in form, is pivoted at each end to the free ends of straps $k$ $k'$, the former of which is pivoted at its other end to the upright frame of the machine, from which it depends, while the latter at the outer end of the platform is pivoted to the outer portion of the platform-frame, from which it extends upward, as seen in Fig. 3 of the drawings. These two straps are free to swing upon their pivotal attachments; hence it is evident that the guard may be adjusted bodily forward and back with reference to the platform by turning the supporting-straps in one direction or the other; but the guard has its own pivotal connection to the two straps, and hence may be turned upon these pivot-bearings to adjust its angle of relation to the platform. The guard may therefore be adjusted to the desired angle with reference to the platform in whatever position it may be placed by the movement of its supporting-arms. It is usually desired to have the rear grain-guard in vertical relation to the platform. It is obvious that this relation can be preserved, for whenever the supporting-straps are swung forward or backward, so as to change the position of the guard, the latter can be at once turned on its own pivots into a vertical position. The guard is therefore capable of two adjustments—one movement bodily as it is carried forward or backward by the swinging straps and the other an axial movement on its pivots, so that it may be adjusted forward and back bodily to suit different lengths of grain, and at the same time turned to any angle in relation to the platform which may be desired.

I do not wish to be understood as limiting my improvements to the precise details of construction and the particular associated parts which have been described above and are shown in the drawings, for mechanical changes may be made in structure, and the improvements may be used in connection with other parts of the machine, constructed and arranged differently from what is herein shown and described.

Having thus described my invention, what I claim as new, and desire to secure by Letters Patent, is—

1. In a harvester, the swinging reel-support D, in combination with the slide F, provided with a series of holes $f$, the connecting-rod $f'$, the cross-bar $a'$, on which the slide is mounted, and which is provided with an aperture $a^2$, the spring G, provided with the stud $g$, and the foot-piece $g'$, connected to the free end of the spring, substantially as and for the purposes specified.

2. In a harvester, a grain-guard mounted at the rear of the platform in adjustable supports by pivot-bearings which permit the guard to be turned in its supports, substantially as and for the purposes specified.

3. In a harvester, the grain-guard K, in combination with the strap $k$, pivoted to the upright frame and depending therefrom, and the strap $k'$, pivoted to the outer end of the platform-frame and extending upward therefrom, the guard being pivoted to the free ends of the said straps, substantially as and for the purposes specified.

GEORGE G. HUNT.

Witnesses:
E. J. TAYLOR,
H. C. PATTERSON.